United States Patent Office 3,646,087
Patented Feb. 29, 1972

3,646,087
PREPARATION OF AMINOPHENYLTRIALKOXY SILANES
Everett W. Bennett, Katonah, and Peter Orenski, Ossining, N.Y., assignors to Union Carbide Corporation, New York, N.Y.
No Drawing. Filed Jan. 8, 1970, Ser. No. 1,534
Int. Cl. C07f 7/02
U.S. Cl. 260—448.2 E                5 Claims

ABSTRACT OF THE DISCLOSURE

A process for preparing aminophenyltrialkoxy silanes by reacting a halophenyltrialkoxy silane with ammonia in the presence of a catalytic amount of copper and cuprous chloride.

BACKGROUND OF THE INVENTION

This invention is directed to a process for producing aminoaryltrialkoxy silane compounds by the ammonlysis of haloaryltrialkoxy silanes. More particularly this invention relates to a process for preparing aminophenyltrimethoxy silane by the ammonolysis of bromophenyltrimethoxy silane.

Heretofore aminoaryl silane compounds have been prepared by nitration of the aryl silane followed by reduction of the nitro group. Although satisfactory on a laboratory scale, this method can create considerable difficulties on a plant scale because of ester hydrolysis caused by the water produced during the reduction step. Moreover, the water is difficult to remove and if not satisfactorily eliminated leads to gelation of the reaction mass.

SUMMARY OF THE INVENTION

It has now been discovered that these disadvantages can be overcome and that aminoaryltrialkoxy silane compounds can be obtained by the ammonolysis of haloaryltrialkoxy silanes.

Therefore, it is an object of this invention to provide an efficient and economical process for preparing aminoaryltrialkoxy silane compounds, especially aminophenyltrimethoxy silane, in high yields. Other objects and advantages of this invention will become readily apparent from the following description and appended claims.

More specifically the instant invention can be described as a process for preparing aminoaryltrialkoxy silanes having the general formula:

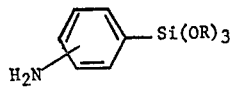

which comprises reacting a haloaryltrialkoxy silane of the formula:

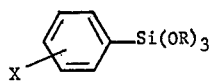

or mixtures thereof with ammonia in the presence of a catalyst comprised of copper and cuprous chloride, wherein each R is independently an alkyl radical having from 1 to 8 carbon atoms and wherein X is a halogen atom selected from the group consisting of bromine and iodine.

DESCRIPTION OF THE PREFERRED EMBODIMENTS

The haloaryltrialkoxy silanes which can be used as the starting materials of this invention include the para-, meta-, and ortho-bromophenyltrialkoxy silanes; the para-, meta- and ortho-iodophenyltrialkoxy silanes, and mixtures thereof. Each alkoxy radical on said silanes can be the same or different and can have from 1 to 8 carbon atoms, such as methoxy, ethoxy, propionoxy, butoxy, t-butoxy, pentoxy, hexoxy, heptoxy, octoxy, 2-ethoxyhexyl, phenoxy, ethoxymethoxy, benzyloxy, and the like. The preferred haloaryltrialkoy silane starting materials are the bromophenyltrimethoxy silanes.

The above-mentioned haloaryltrialkoxy silanes as well as methods for their preparation are well known in the art. Generally, it is preferred to prepare said haloaryltrialkoxy silanes by bominating or iodinating phenyltrihalosilanes of the formula

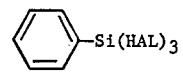

wherein HAL represents a halogen radical such as fluorine, chlorine, bromine or iodine, preferably chlorine, followed by alcoholysis with an alcohol of from 1 to 8 carbon atoms to obtain the desired iodo- or bromophenyltrialkoxy silane compound. For example, the bromination of phenyltrichlorosilane in the presence of a catalytic amount of a catalyst, such as, iron powder, iodine, aluminum powder and especially anhydrous ferric chloride, at a reaction temperature ranging from about 0° to 150° C., preferably 60° to 90° C., followed by methanolysis of the bromophenyltrichlorosilanes in a solvent, e.g., toluene, at reflux, results in a mixture of para-, meta- and ortho-bromophenyltrimethoxy silanes. Since the mixture of these bromophenyltrimethoxy silanes are difficult to separate, it is generally preferred to employ the mixture of all three isomers of para-, meta- and orthobromophenyl-trimethoxy silane as the starting material for the instant ammonolysis reaction. This is particularly the case in view of the fact that conventional uses of isomeric aminophenyltrimethoxy silane products do not normally call for their separation. Of course, it should be understood that, if desired, para-, meta- and orthobromo- or iodophenyltrialkoxy silanes can be used individually or for that matter in any combination of mixtures as the starting material for the instant ammonolysis process and such individual silanes can be obtained by fractional distillation of the isomer bromo- or iodophenyltrialkoxy silane product mixture generally produced by the above halogenation and alcoholysis procedure. Alternatively the individual para-, meta- and orthoaminophenyltrialkoxy products can also be obtained by fractional distillation of a final aminophenyltrialkoxy silane isomer mixture, if desired.

The reaction temperature of the instant ammonolysis process can range from about 25° to 200° C. Preferably a temperature of about 105° to 125° C. is employed.

Theoretically, the chemical reaction involves two moles of ammonia per mole of halophenyltrialkoxy silane starting material for complete reaction (i.e. 100% yield). However, it should be understood that the process is operative with less than 2 moles of ammonia, the result being incomplete conversion (i.e. less than 100% yield). Accordingly, the amount of ammonia employed is not critical. To insure the best results and highest yields, however, it is preferred to use more than 2 moles of ammonia for every mole of starting material and most preferably to employ at least about a nine-fold molar excess of ammonia based on the weight of the starting material.

The copper catalyst employed in the instant ammonolysis process comprises a mixture of copper powder and cuprous chloride. The amount of catalyst employed is not critical for it obviously need only be a catalytic amount. The ratio of copper powder to cuprous chloride is preferably at least about 3 parts by weight to 1 part by weight and most preferably about 5 parts by weight of copper powder are used for every one part by weight of cuprous chloride, although higher amounts of copper can be employed if desired.

Of course, it should be understood that while such is not generally necessary the instant process can be carried out in the presence of an inert solvent if desired. Moreover, it is also preferred to carry out the ammonolysis in a closed vessel, e.g. a rocking steel autoclave under autogenous pressures.

The following examples are illustrative of the present invention and are not to be regarded as limitative. It is to be understood that all parts, percentages and proportions referred to herein and in the appended claims are by weight unless otherwise indicated.

EXAMPLE 1

Bromination of phenyltrichlorosilane 2115 grams (10 moles) of phenyltrichlorosilane and 5 grams of ferric chloride were charged to a 5 liter, 4-neck flask equipped with a mechanical stirrer, a 500 ml. addition funnel, a reflux condenser, a thermometer and a nitrogen inlet. The mixture was stirred and heated to 62° C. and 1620 grams (540 ml. or 10 moles) of liquid bromine were added at a rate of 25 mil per 10 minutes over 4 hours. The temperature maintained itself at 75° C. and hydrogen bromide was removed with nitrogen. Once addition was complete, the mixture was heated with nitrogen sparging at 75° C. for 2 hours. Vapor phase chromatographic analysis of the reaction mixture showed an 80 percent yield of brominated phenyltrichlorosilane which infrared analysis showed to comprise about 70 percent p-bromophenyltrichlorosilane, about 25 percent m-bromophenyltrichlorosilane and about 5 percent o-bromophenyltrichlorosilane.

EXAMPLE 2

Methanolysis of bromophenyltrichlorosilane

The crude reaction product of Example 1, was subjected to esterification by first adding 1,000 ml. of toluene to the mixture which was then brought to reflux. 1152 grams (36 moles) of methanol were then added over 4 hours using a Dean Stark trap to remove hydrogen chloride contaminated methanol. When the addition was completed and the mixture cooled, gaseous ammonia was passed through it for 15 minutes to neutralize any residual hydrogen chloride at which point a white precipitate was deposited. Filtration removed 114 grams of solids (ammonium chloride) and the filtrate was distilled to remove the toluene and to yield about 2050 grams (the main fraction) having a boiling point of 110°–130° C. at 1.5 mm., which was shown by vapor phase chromatography to consist of about 80 percent of a mixture of ortho-, meta- and para- bromophenyltrimethoxy silane.

EXAMPLE 3

Ammonolysis of bromophenyltrimethoxy silane

A 3-liter rocking steel autoclave vessel was cooled to —78° C. and charged with 831 grams (3 moles) of the distilled mixture of ortho-, meta- and para-bromophenyltrimethoxy silane produced according to Example 2, 125 grams of copper power, 25 grams of cuprous chloride, 1200 ml. of anhydrous ammonia (a 9-fold molar excess), and then heated to 110° C. for 5 hours. The vessel was again cooled to —78° C. before opening and the reaction product washed out with three 200 ml. portions of benzene and filtered. Distillation of the filtrate produced:

(a) About 600 ml. of benzene at 760 mm.; and (b) About 400 grams (i.e. a 60 percent yield) of a main fraction having a boiling point of 125° to 135° C. at 0.8 mm. which was further shown by conventional chromatographic and spectroscopic methods to consist of the desired isomer product mixture of ortho-, meta- and para-aminophenyltrimethoxy silane. The neutral equivalent of the isolated product mixture was about 4.80 meq./gram (theoretical, 4.7 meq./gram).

Similar aminophenyltrialkoxy silanes may be prepared by replacing the above bromophenyltrimethoxy silane starting materials with other silanes such as a mixture ortho-, meta-, and paraiodo-phenyltrimethoxy silanes or by employing individual starting materials such as para-bromophenyltrimethoxy silane alone.

The aminophenyltrimethoxy silane products of this invention have a number of conventional uses, such as high temperature, oxidatively stable coupling agents for high performance polymers of the polyimide and polybenzimidazole types as shown by U.S. Pat. No. 2,389,802.

Various modifications and variations of this invention will be obvious to a worker skilled in the art and it is understood that such modifications and variations are to be included within the purview of this application and the spirit and scope of the appended claims.

What is claimed is:

1. A process for preparing aminophenyltrialkoxy silanes having the formula

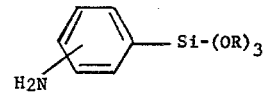

wherein each R is individually a radical having from 1 to 8 carbon atoms selected from the group consisting of alkyl, phenyl, and benzyl radicals, which comprises reacting a halophenyltrialkoxy silane having the formula

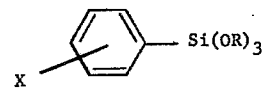

or mixtures thereof, wherein R is the same as defined above and wherein X is a halogen selected from the group consisting of bromine and iodine with ammonia in the presence of a catalytic amount of a mixture of copper and cuprous chloride.

2. A process as defined in claim 1, wherein X is bromine and R is methyl.

3. A process as defined in claim 2 wherein bromophenyltrimethoxy silane starting material is para-bromophenyltrimethoxy silane.

4. A process as defined in claim 2, wherein the bromophenyltrimethoxy silane starting material comprises a mixture of ortho-, meta- and para-bromophenyltrimethoxy silanes.

5. A process as defined in claim 4 wherein the amount of ammonia employed is at least a nine-fold molar excess based on the weight of the bromophenyltrimethoxy silanes, wherein the amount of copper to cuprous chloride is at least 5 parts by weight to one part by weight and wherein the reaction temperature is at least about 110° C.

References Cited

UNITED STATES PATENTS 3,507,898   4/1970   Pino _____ 260—448.8 R

OTHER REFERENCES

Bazant, Organosilicon Cpds., (1965), pp. 333–4, QD 412, S 6B3.

JAMES E. POER, Primary Examiner

W. F. W. BELLAMY, Assistant Examiner

U.S. Cl. X.R.

260—448.8 R